Aug. 25, 1925.  
W. C. DEVEREAUX  
AUTOMOBILE DOOR LOCK  
Filed Feb. 9, 1923  
1,551,240  
2 Sheets-Sheet 1
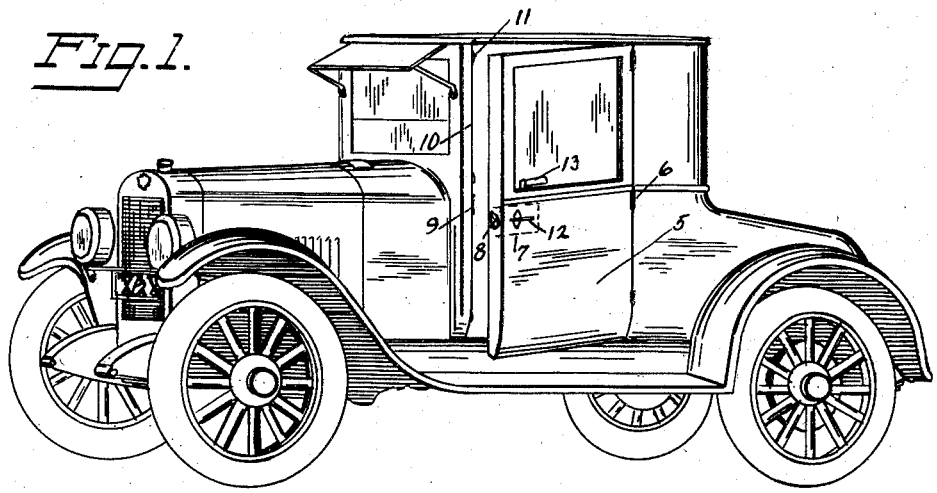
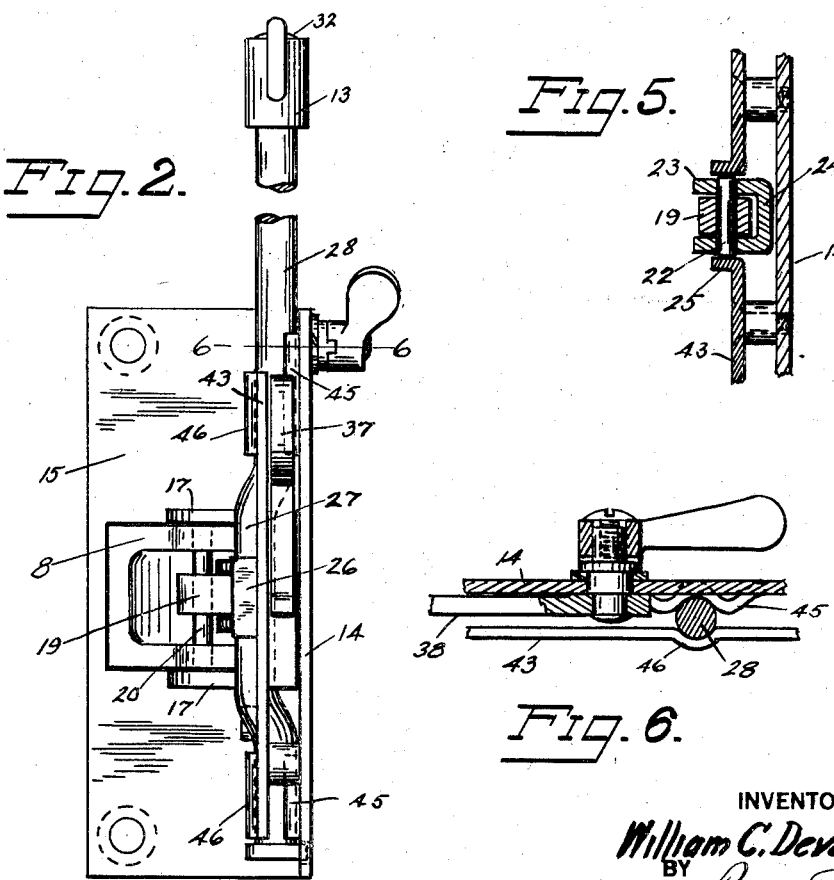
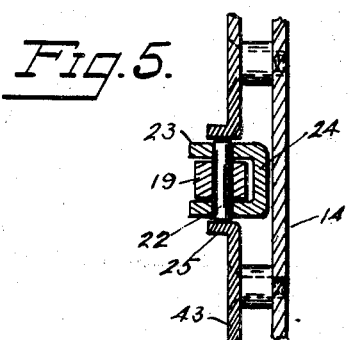
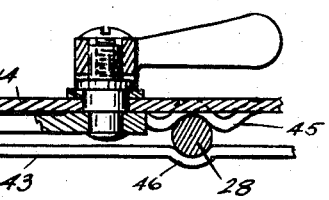
INVENTOR  
William C. Devereaux  
BY  
Rex Frye.  
ATTORNEY

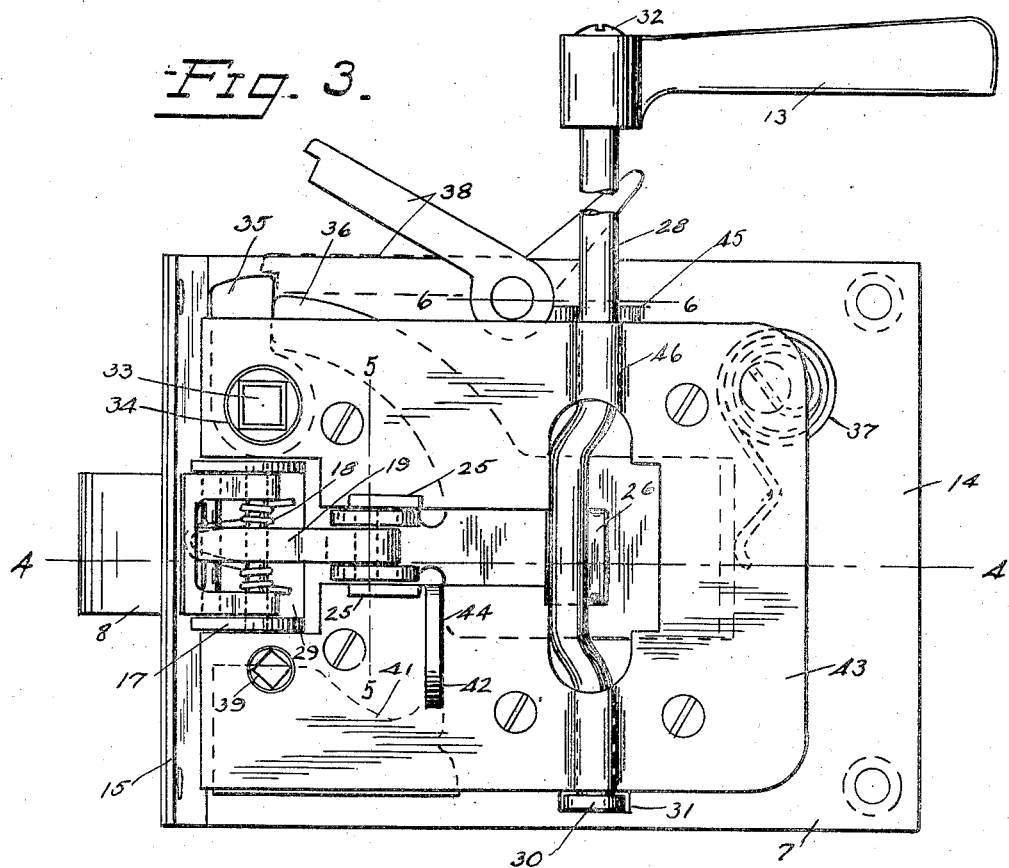
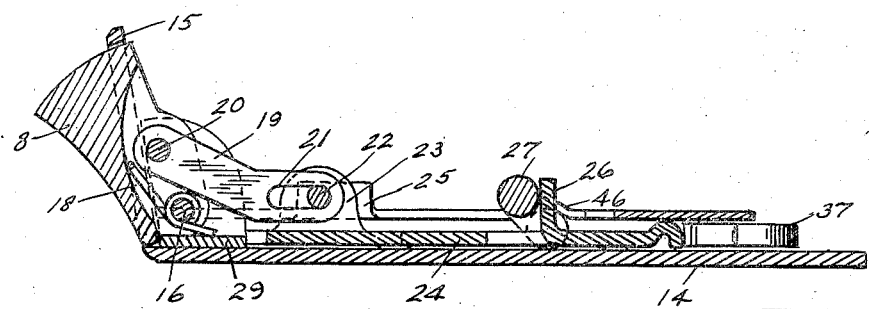

Patented Aug. 25, 1925.

1,551,240

UNITED STATES PATENT OFFICE.

WILLIAM C. DEVEREAUX, OF DETROIT, MICHIGAN.

AUTOMOBILE DOOR LOCK.

Application filed February 9, 1923. Serial No. 617,933.

*To all whom it may concern:*

Be it known that I, WILLIAM C. DEVEREAUX, a citizen of the United States, and residing at Detroit, county of Wayne, and State of Michigan, have invented a new and Improved Automobile Door Lock, of which the following is a specification.

This invention relates to locks, and more particularly to locks for securing the doors of automobiles and like vehicles.

The automobile door locks now in general use have several outstanding defects, among the more prominent of which are the inability of the horizontally-sliding latch-bolt to automatically compensate for the varying distances between door and jamb as the usual rubber jamb bumpers become worn or displaced and the unsightly open slot in the upper edge of the lock casing through which extends the vertically-swinging lever for opening the door from the inside. The present invention has for its primary object the elimination of these defects, and accomplishes this by mounting both the latch-bolt and the handle of the inside opening lever to rotate in horizontal planes with pin and slot connections between to permit the latch-bolt to swing through greater or lesser arcs as needed to compensate for the wear of the rubber bumpers.

A further object is the provision of a simplified construction including the arrangement of lips or flanges on the lock casing to guide the latch-bolt and connecting links in their movements while preventing the accidental dislocation of the vertically disposed pins connecting the links to each other and to the latch-bolt.

The above and other objects of my invention will be apparent from the following description wherein reference is made to the accompanying drawings illustrating a preferred embodiment of my invention, and wherein similar reference numerals designate similar parts throughout the several views:

In the drawings:

Fig. 1 is a perspective view of an automobile door and adjacent casing with the door in open position;

Fig. 2 is an end view of the lock removed from the door;

Fig. 3 is a front elevation of the lock;

Fig. 4 is a cross section taken substantially on the line 4—4 of Fig. 3;

Fig. 5 is a detail section taken substantially on the line 5—5 of Fig. 3, and

Fig. 6 is a detail section taken substantially on the line 6—6 of Fig. 2.

Referring now to the drawings the numeral 5 designates an automobile door pivoted on hinges 6 and carrying the lock casing 7 in position whereby the latch-bolt 8 protrudes from the free edge of the door for co-operation with the striker plate 9 fixed on the door jamb 10. Rubber bumpers 11 project laterally from the door jamb so as to be engaged by the door 5 to prevent rattling of the door against the jamb. The latch-bolt 8 is adapted to be thrown from the outside of the door by a handle 12 and from the inside of the door by a handle 13, as hereinafter described.

The lock casing comprises a vertically-disposed plate 14 secured in the inner wall of the door and an edge flange 15 apertured to permit the swinging of the latch-bolt 8 therethrough to any desired degree. The latch-bolt 8 is pivoted on the pin 16 journaled in flanges 17 of a bracket or yoke 29 carried by the plate 14. A spring 18, herein shown as fulcrumed on the pin 16, tends to press the latch-bolt outwardly to its fullest extent. A connecting link 19 is pivoted at one end to the latch-bolt 8 through a pin 20 fitted into aligned apertures in the sides of the latch-bolt, and adjacent its other end is provided with an elongated slot 21 for the reception of the pin 22 fitted into aligned apertures in the upturned flanges 23 on the forward extremity of the traveler-link 24. The slot 21 and pin 22 are arranged to permit movement of the lock-bolt 8 independently of the traveler-link 24, whereby the lock-bolt is permitted to automatically take up any wear of the rubber bumpers 11 by swinging outwardly through slightly greater arcs. The pins 20 and 22, when in operative position, are vertical and some provision must be made to prevent their fall by gravity. This is accomplished in the construction herein shown by extending the lower flange 17 of the bracket 29 for a sufficient distance to engage the lower extremity of the pin 20 (note dotted line in Fig. 4) and by bending a lip or flange 25 from the cover plate 43 to support the lower extremity of the pin 22 (note Fig. 5).

The traveler-link 24 is provided with an upturned flange 26 adapted to be engaged by the crank portion 27 of the vertically disposed spindle 28 carrying at its upper extremity the handle 13 for opening the door from the inside. The spindle 28 is journaled between spaced shoulders 45 struck up from the plate 14 and recesses 46 on the cover plate 43 (see Fig. 6) and is held against vertical movement by means of a ring 30 secured on the lower extremity of the spindle and projecting through a slot 31 in the plate 14. It will be evident that this arrangement of the spindle 28 requires only an aperture in the window sill of sufficient area to permit clearance of the spindle, and thereby renders unnecessary the elongated slot in the window sill now generally used to permit a vertically-swinging lever to operate. The handle 13 may be suitably secured to the upper extremity of the spindle 28, as by the screw 32. The outside handle 12 is provided with a squared shank 33 fitting within an aperture in the hub 34 of the lever 35, which lever is arranged between the edge flange 15 of the plate 14 and a projection 36 on the traveler-link 24 (see Fig. 3) whereby it normally provides a stop member for limiting the forward movement of the traveler-link. When the outside handle is turned the lever 35 is swung to force the traveler-link rearwardly and through the connecting-link 19 swings the latch-bolt 8. When the handle is released, the spring 37 engaging the rear extremity of the traveler-link returns the members to their normal position, as shown in Fig. 3.

When it is desired to lock the doors of the automobile to prevent their being opened by rotation of the outside handle 12 the latch 38 is swung downwardly into the dotted line position shown in Fig. 3 engaging the lever 35 to prevent its travel. All but one of the doors of the automobile are locked with their latches 38 engaging the levers 35, and the remaining door is locked from the outside of the car through a key-controlled lock. Any preferred type of key-controlled lock can be used in connection with this invention, the lock-controlled shank 39 being arranged to engage the vertically-moving slide plate 41 having a flange 42 normally resting out of the path of movement of the traveler-link 24, but guided for movement into the path of the traveler-link 24 whenever the plate 41 is moved. A cover plate 43 is secured over the working portions of my improved door lock and a slot 44 therein is preferably arranged to guide the flange 42 in its movements.

The operation of my door lock is believed to be apparent. The spring 18 normally presses the latch-bolt 8 outwardly and holds it in engagement with the securing plate 9 to prevent the accidental opening of the door. When it is desired to open the door from the outside of the car the handle 12 is rotated, swinging the lever 35 to move the traveler-link 24 rearwardly and through the connecting link 19 swinging the latch-bolt 8 inwardly to release the door. When it is desired to open the door from the inside of the car the handle 13 is grasped and swung through a horizontal arc, thereby turning the crank portion 27 to move the traveler-bolt 24 rearwardly to release the latch-bolt 8. The operating parts are returned to their normal position through the medium of the spring 37 whenever the handles are released, and the door can be again locked by merely pulling the door into engagement with the jamb, the latch-bolt 8 swinging against the tension of the spring 18 to permit the inward movement of the door and then catching within the striker plate 9 to secure the door in closed position.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim:—

1. In a vehicle door lock, the combination of a supporting plate, a latch-bolt pivoted in said plate to swing into and out of locking position, a crank-shaft rotatably mounted in said plate, and a link system connecting the latch-bolt and crank-shaft whereby the latch-bolt is swung upon rotation of the crank-shaft, the link system including overlapping members slidable relatively to each other to also permit independent swinging movement of the latch-bolt.

2. In a vehicle door lock, the combination of a supporting plate, a latch-bolt pivoted on said plate to swing into and out of locking position, a crank shaft mounted in said plate to oscillate in a plane parallel to the axis of the latch bolt, and a link system including a link having a projection adapted to be contacted by the crank shaft, a second link having an elongated slot therein, and pins connecting the second link with both the first-mentioned link and the latch-bolt.

3. In a vehicle door lock, the combination of a supporting plate, a latch-bolt pivoted in said plate to swing into and out of locking position, a crank-shaft rotatably mounted in said plate, and a link system connecting the latch-bolt and crank-shaft whereby the latch-bolt is swung upon rotation of the crank-shaft, the link system including a link having a projection adapted to be contacted by the crank-shaft, a second link having an elongated slot therein, pins connecting the second link with both the first-mentioned link and the latch-bolt, and lugs extending from the supporting plate for preventing the accidental dislocation of said pins.

4. In a vehicle door lock, the combination of a supporting plate, a latch-bolt pivoted thereon to swing into and out of locking position, a link pivotally connected with the latch-bolt and having an elongated slot therein, a spring normally pressing the latch-bolt into locking position, a traveler-link guided for reciprocating movement on the plate and carrying a pin movable in said slot and a lug projecting laterally of the plate, a shaft journaled on the plate and having a crank-portion engaging said link, and a spring engaging the traveler-link and normally maintaining said lug in engagement with the crank-portion.

5. In a vehicle door lock, the combination of a supporting plate, a latch-bolt pivoted thereon to swing into and out of locking position, a link pivotally connected with the latch-bolt and having an elongated slot therein, a spring normally pressing the latch-bolt into locking position, a traveler-link guided for reciprocating movement on the plate and carrying a pin movable in said slot and a lug projecting laterally of the plate, a shaft journaled on the plate on opposite sides of the traveler and having a crank-portion between the journals for engaging said lug and a shoulder adjacent one of the journals, the plate having a slot therein for receiving said shoulder to prevent vertical movement of the shaft, and a spring normally maintaining said lug in engagement with the crank-portion of the shaft.

In witness whereof I hereunto set my hand.

WILLIAM C. DEVEREAUX.